United States Patent [19]

Schradin

[11] Patent Number: 4,637,050

[45] Date of Patent: Jan. 13, 1987

[54] METHOD AND APPARATUS FOR SUPPRESSING INTERFERENCE IN A SIGNAL, IN PARTICULAR AN AUDIO SIGNAL

[76] Inventor: Fred Schradin, Mörikestr. 4, Reutlingen 1, Fed. Rep. of Germany, D-7410

[21] Appl. No.: 776,021

[22] PCT Filed: Dec. 31, 1984

[86] PCT No.: PCT/DE84/00285

§ 371 Date: Oct. 18, 1985

§ 102(e) Date: Oct. 18, 1985

[87] PCT Pub. No.: WO85/03160

PCT Pub. Date: Jul. 18, 1985

[30] Foreign Application Priority Data

Jan. 3, 1984 [DE] Fed. Rep. of Germany ....... 3400103

[51] Int. Cl.$^4$ ............................................. G11B 20/24
[52] U.S. Cl. ..................................... 381/94; 364/571; 455/63
[58] Field of Search ............................ 381/44, 71, 56; 364/571, 572; 455/63, 296, 307; 375/11, 34, 12

[56] References Cited

U.S. PATENT DOCUMENTS

| | | | |
|---|---|---|---|
| 3,784,749 | 1/1974 | Shigeyama | 381/94 |
| 3,863,228 | 1/1975 | Taylor | 381/94 |
| 4,315,319 | 2/1982 | White | 381/94 |
| 4,501,014 | 2/1985 | Blüthgen | 381/94 |

FOREIGN PATENT DOCUMENTS

| | | |
|---|---|---|
| 0003588 | 2/1979 | European Pat. Off. . |
| 47386 | 3/1982 | European Pat. Off. . |
| 83755 | 7/1985 | European Pat. Off. . |
| 2717530 | 1/1980 | Fed. Rep. of Germany . |
| 2938937 | 4/1980 | Fed. Rep. of Germany . |
| 3003556 | 9/1981 | Fed. Rep. of Germany . |
| 3028334 | 1/1983 | Fed. Rep. of Germany . |
| 2137058 | 9/1984 | United Kingdom ........ 381/94 |

OTHER PUBLICATIONS

J. Paul, "Adaptive Digital Techniques for Audio Noise Cancellation", IEEE Symposium, May 1978, pp. 232-236.

Nakano, P., "A new 8-Bit PCM Audio Recordings", IEEE Transactions, 8/1982.

IEEE Transactions on Biomedical Engineering, "A Digital System for Enhancing the Fetal Electrocardiogram", pp. 80-86, Jan. 1969, T. Rhyne.

Fernseh- und Kino-Technik, 35, year, No. 6/1981, pp. 199-206, K. Harder, "Digitalisierung von Tonsighalen und ihre Verarbeitung".

*Primary Examiner*—Gene Z. Rubinson
*Assistant Examiner*—L. C. Schroeder
*Attorney, Agent, or Firm*—Holman & Stern

[57] ABSTRACT

For suppressing interference in an audio signal comprising a useful signal component and an interference signal component in the method according to the invention firstly the original audio signal is sampled and digitally recorded. At the same time the level of the interference signal component is separately detected and sampled, the sample values being stored as reference interference signal under the control of a computer retaining the phase relationship with respect to the original audio signal. The recorded digitized signal is then processed under the control of a computer at a predetermined speed and the interference signal component thereof is compensated in dependence upon the stored reference interference signal. An apparatus for carrying out this method comprises an analog reproduction unit (1) for an original master tape (3), an analog/digital converter (4), a digital recording unit (6), an interference signal separating means (7), a memory means (11) for storing the reference interference signal, a digital reproduction unit (24) and a processor (9) in which the compensation of the signal reproduced by the digital reproduction unit (24) is effected in dependence upon the interference signal data present in the memory means (11).

22 Claims, 22 Drawing Figures

METHOD AND APPARATUS FOR SUPPRESSING INTERFERENCE IN A SIGNAL, IN PARTICULAR AN AUDIO SIGNAL

CROSS REFERENCE TO RELATED APPLICATION(s)

This U.S. application stems from PCT International Application No. PCT/DE84/00285 filed Dec. 31. 1984.

The invention relates to a method for suppressing interference in an original signal, in particular an audio signal, comprising a useful signal component and an interference signal component, and to an apparatus for carrying out said method.

As is known, in an electrical signal only the component which lies above the level of the interference signal component present in the signal can be utilized. In particular, in the case of an electroacoustic or audio signal the interference signal component is no longer subjectively perceived in those regions of the signal in which the signal amplitude is above the interference level caused for example by noise. However, to make the interference level inaudible also in the regions of the signal in which the amplitude of the useful signal component is beneath the interference level, it is necessary to carry out a suppression operation to remove the signal regions dominated by the interference level. To avoid then causing any audio physiological interference point the curve ends of the remaining signal regions must then be connected together in suitable manner. However, at the moment there would appear to be no suitable known method for this which can be carried out with an economically acceptable expenditure.

The invention is based on the problem of providing such a method and an apparatus for carrying out said method by which with relatively low expenditure a substantially complete interference suppression can be obtained.

This problem is solved as regards the method in that the original signal is digitally recorded with a sampling frequency corresponding at least to the essential information content of its useful signal component, that the interference signal component is detected and its level stored as reference interference signal with a sampling frequency corresponding at least to a level change rate of the interference signal component under the control of a computer in phase synchronism with the recorded digitized signal, and that the recorded digitized signal is processed with a speed independent of its recording speed and its interference signal component compensated under computer control in dependence upon the stored reference interference signal.

By the digital recording of the generally analog original signal, on the one hand a coding of the signal suitable for the computer-controlled processing is obtained. On the other hand, this recording operation permits the method to be carried out independent of the recording and time. Due to the related possible choice of the processing speed independently of the recording speed the difficulty of a data flow of the digitally recorded signal which is too high for the computer-controlled processing is also eliminated. Likewise, the data flow corresponding to the interference signal component can readily be reduced to a speed suitable for computer-controlled storing because for carrying out the method it suffices to store the level change of the interference signal component which can be detected with a substantially reduced data quantity per time unit. This is because it suffices for the compensation following the readout from the store to know the level of the interference signal component, the detailed variation of the interference signal component not being important.

The main use of the method according to the invention will no doubt lie in commercial music production. For example, by compensating the interference signal component in historic recordings the latter could be made available in modern sound quality.

Preferably the method according to the invention is carried out in that the interference signal component is split into a hum component and a noise component and the corresponding reference interference signals are separately stored. This measure takes account of the different nature of the hum component and the noise component. Whereas the hum component is formed by a low-frequency ripple which can easily be compensated by a phase-inverted superimposing of a corresponding ripple signal, because of the separate storing of the corresponding reference interference signals the noise component can be treated separately from the hum component.

In particular, to compensate the hum component it suffices to store as reference interference signal for the hum component the amplitude thereof and the phase thereof with respect to the original signal. This completely defines the phase-inverted signal necessary for the compensation.

In a convenient embodiment of the method according to the invention the hum component is determined as the frequency component of the original signal lying in a predetermined hum frequency interval. This can easily be effected by a suitable filter. Any small loss of the useful signal component proves to be negligible.

It is also found convenient and simple to detect the noise component as the component of the original signal lying below a predetermined amplitude limit small with respect to the mean level of the original signal. Instead of this detection, very simple to carry out, or alternatively additionally thereto it is further possible to detect the noise component as the component of the original signal lying above a predetermined frequency limit disposed beyond the essential frequency components of the useful signal component. Admittedly, with the first detection method of the noise component by means of the amplitude limit in the noise component a correspondingly small useful signal component may also be contained. This is however of no consequence to the execution of the method according to the invention because the method according to the invention requires only a knowledge of the level of the noise component.

However, a still more exact detection is achieved in a preferred embodiment of the method according to the invention in that the noise component is detected in the pauses of the useful signal. Such pauses frequently occur especially in speech and music. Alternatively or additionally it is further provided in an advantageous embodiment of the method according to the invention that the noise component is detected as the signal component remaining in the region of the zero passages of the original signal. These two embodiments achieve firstly an adequately accurate detection of the level of the noise component and secondly the number of sampling points per unit time is small enough to permit readily the computer-controlled storing as reference interference signal.

A particularly advantageous procedure is distinguished in that in the compensation firstly a compensation signal corresponding to the stored hum interference signal in amplitude and frequency is superimposed phase-inverted on the recorded digitized signal, and that the signal from which the hum component has been removed in this manner is recorded as new digitized signal and thereafter the noise component is compensated. This sequence is particularly convenient because the compensation of the noise component can be carried out particularly accurately and reliably on the signal already free from hum.

In a preferred embodiment of the method according to the invention the compensation of the noise component is carried out in that the amplitude of the digitized signal is compared in phase synchronism with the reference interference signal corresponding to the noise component, that the digitized signal is put equal to zero at the points at which its amplitude is smaller or equal to the reference interference signal, and that the remaining digitized signal in the regions set to zero is supplemented under computer control by interpolation. By this zeroing firstly all the signal components identified as noise interference are eliminated. Nevertheless, this does not introduce any appreciable perceptible interferences because by the subsequent interpolation the wave train of the useful signal component interrupted by the regions set to zero is supplemented in natural manner.

According to a further idea of the invention a correction is also provided of dynamic compressions. Such dynamic compressions are carried out in the analog recording of sound recordings on changing from piano to forte sections to avoid exceeding the permissible maximum modulation of the recorders, for example of an analog magnetic tape. In detail, the piano section modulated beyond its natural level is modulated down shortly before the start of the forte section so that another rise to the full modulation does not occur until in the forte section. This change in the variation of the modulation results of course in a corresponding change in the level of the noise component. Therefore, in a further development of the method according to the invention the level variation of the original presentation on which the original signal was based is re-established in that the level of the signal from which the hum has been removed is modulated again in proportion to a change of the level of the noise component.

In the invention account has also been taken of the fact that the original signal can be distorted by the influence of amplitude limiters, i.e. cut off in the amplitude. In a preferred embodiment of the method according to the invention re-establishment of the signal corresponding to the original presentation is made possible in that the compensated digitized signal is replaced in the regions which have amplitude limitation under the control of a computer by an interpolation curve. For carrying out the method according to the invention the phase relationship between the digitized signal and the reference interference signal must be retained. This may be done for example in particularly simple manner in that the phase synchronization is carried out by continuous consecutive counting of the bits of the digitized signal.

An apparatus provided within the scope of the invention for carrying out the method comprises an analog reproduction unit by which the original signal recorded analog on a recording medium can be reproduced, and an analog/digital converter by which the reproduced original signal can be converted with the sampling frequency associated with the useful signal component to the digitized signal, a digital recording unit for recording the digitized signal, an interference signal separating means by which the interference signal component contained in the original signal can be detected and can be digitized with the sampling frequency associated with the interference signal component, a memory means which is controlled by a processor and into which the reference interference signal formed by the sampling of the interference signal component can be entered according to amplitude and phase position related to the digitized signal, a digital reproduction unit by which the recorded digitized signal can be reproduced with the predetermined processing speed and a compensation means which is controlled by the processor and in which the interference signal component in the reproduced digitized signal can be compensated in dependence upon the reference interference signal present in the memory means.

In an advantageous embodiment of the apparatus the interference signal separating means comprises a band filter means which is tunable to the hum frequency and has adjustable band width, by which the hum component of the interference signal component can be detected and a corresponding separately storable reference interference signal can be produced. This band filter means permits in simple manner the separation of the hum component and by the adjustability is adaptable to various conditions of the hum-disturbed original signal.

Similarly, for simple construction of the apparatus it is convenient for the interference signal separating means to comprise a combined amplitude filter and high-pass means by which the noise component of the interference signal component is detected and a corresponding separately storable reference interference signal can be generated.

As already explained above in conjunction with an advantageous embodiment of the method, with a dynamic compression of the original signal the level of the noise component is correspondingly altered. It is therefore provided in an advantageous further development of the apparatus according to the invention that the compensation means comprises a level controlled by the processor by which the reproduced signal can be remodulated in dependence upon the level of the noise component. By this remodulation the dynamics of the original recording on which the original signal was based can be re-established.

To enable the digitized signal corresponding to the original signal to be buffered between individual processing stages it is further provided in a particularly preferred embodiment that the memory means comprises a memory area into which the digitized signal may be entered.

Finally, in another further development of the apparatus according to the invention the signal separating means comprises a measuring device by which the level variation of the noise component detected can be indicated. In this manner an additional monitoring of the suppression operation by the user is possible, similarly to the monitoring made by a sound engineer of the original signal during the recording.

Further features, details and advantages of the invention will be apparent from the following description and the drawings to which reference is made regarding a disclosure essential to the invention of all the details not expressly mentioned in the text. In the drawings.

Figure 1A:
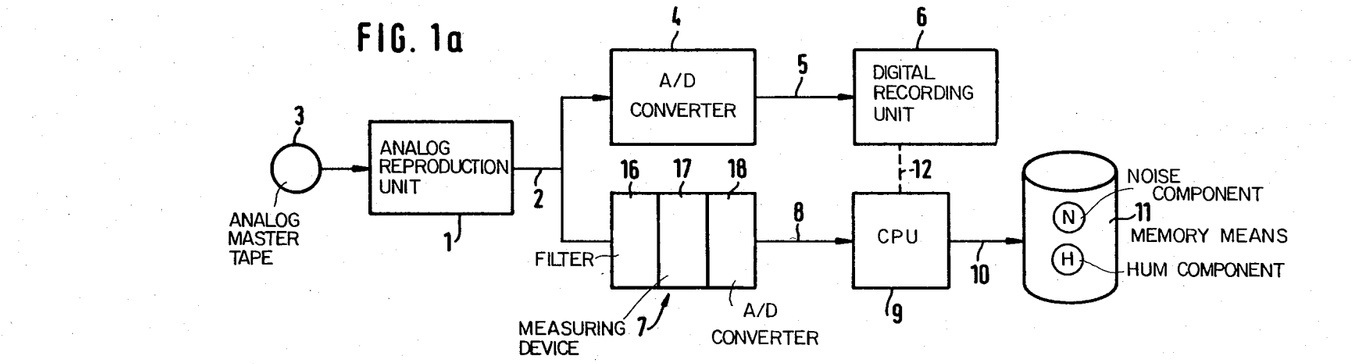
FIG. 1a is a block diagram of that part of an apparatus for suppressing interference in a signal which serves to detect the interference signal.

According to FIG. 1a an apparatus for suppressing interference in an original signal comprising a useful signal component and an interference signal component includes an analog reproduction unit 1 from the output 2 of which the original signal obtained by reproduction from an analog master tape 3 and formed for example by an audio signal can be taken. Connected to the output 2 is an analog/digital converter 4 whose output is connected via a signal path 5 to the input of a digital recording unit 6.

The output 2 of the analog reproduction unit 1 is further followed by an interference signal separating means 7 whose output is coupled via a signal path 8 to the input of a processor 9. The processor 9 is connected via a signal path 10 to a memory means 11. A synchronization connection existing between the digital recording unit 6 and the processor 9 controlling the memory 11 is indicated symbolically by a dashed line 12.

Figure 2A:
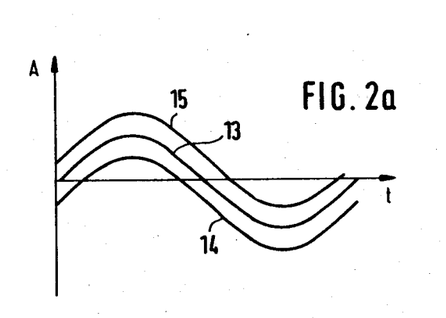
FIGS. 2a and 2b show signal curves of the signal containing a useful signal component and a noise signal component.

According to FIG. 2a there is superimposed on the useful signal component 13 of the original signal an interference signal component which lies between a lower envelope curve 14 and upper envelope curve 15 and the maximum size of which limited by the spacing between the lower and upper envelope curves 14, 15 is exaggerated in FIG. 2a. Apart from this interference signal component illustrated in FIG. 2a and formed by a noise component a hum component not shown in FIG. 2a having a low-frequency hum frequency is also present. This disturbed original signal appearing at the output 2 according to FIG. 1a is applied to the input of the interference signal separating means 7 by which firstly the hum component and secondly the noise component is detected. In particular, the interference signal separating means 7 comprises for this purpose a filter means 16 which may comprise on the one hand a band filter means tunable to the hum frequency and having an adjustable band width and on the other a combined amplitude filter and high-pass means. The former serves to separate the hum component and the latter to separate the noise component. Whereas the hum component is defined by the hum frequency the noise component may be detected by its level limited by the spacing of the lower and upper envelope curves 14, 15.

Figure 2B:
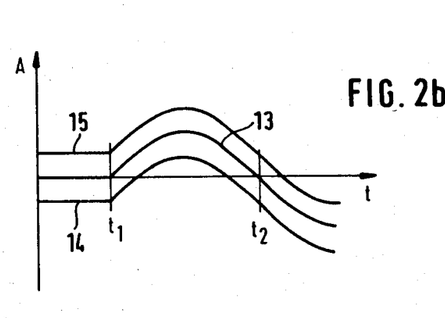

In particular, provided in the interference signal separating means 7 is a measuring means 17 by which the level variation of the noise component is detected. This is done for example according to FIG. 2b in the region of the points at which the useful signal component 13 assumes the value zero. This is the case in FIG. 2b for the entire region of the original signal up to the instant $t_1$ which for example corresponds to a pause in the piece of music on which the original signal was based. Likewise, the level of the noise component may also be detected in the region of the instant $t_2$ which corresponds to a zero passage of the useful signal component 13. The measuring means 17 may also include a measuring device by which the level variation of the noise component is visibly displayed for a user.

The level variation of the noise component detected in this manner is sampled in an analog/digital converter provided in the signal separating means 7 with a sampling frequency corresponding at least to its rate of change and thereby a digital reference interference signal R is generated which with the aid of the processor 9, which due to the synchronization connection 12 also forms phase information on the reference interference signal with respect to the original signal, is entered into the memory means 11. Likewise, the amplitude and the phase of the hum component is entered into the memory means 11 as further reference interference signal B for the hum component by means of the processor 9.

Figure 3A:
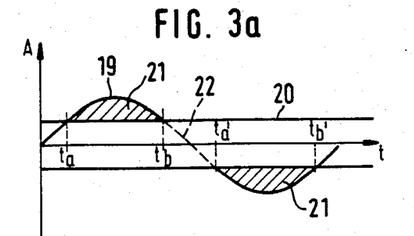
FIGS. 3a to f show individual signal forms in the compensation of the interference signal component, FIGS. 4a and b show signal forms in the compensation of limiter effects
Figure 3B:
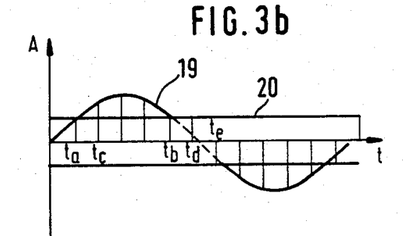
Figure 3C:
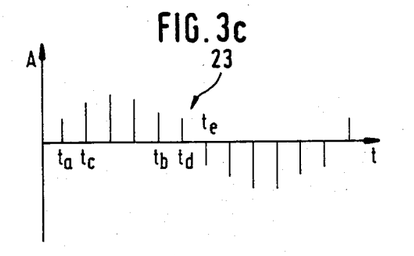

As exactly apparent from FIG. 3a the original signal 19 is greater between the instants $t_a$ and $t_b$ than the level 20 of the noise component, which is shown exaggerated in FIG. 3a. Although the original signal 19 has the interference component due to the noise in the hatched region 21 included between the instants $t_a$ and $t_b$, this interference component is not subjectively perceived as detrimental because of the dominance in magnitude of the useful signal component 13. In contrast, the region of the useful signal component outside the interval $t_a$, $t_b$ is submerged in the interference signal component, as indicated by the dashed curve 22. Accordingly, the digitized signal 23 recorded on the digital recording unit 6 and illustrated in FIG. 3c represents a useful signal component only at the sampling points $t_c$ lying in FIG. 3b between the sampling points $t_a$ and $t_b$ whilst for example at the sampling points $t_d$ and $t_e$ outside this interval only a value concealed by the noise interference is obtained.

Figure 1B:
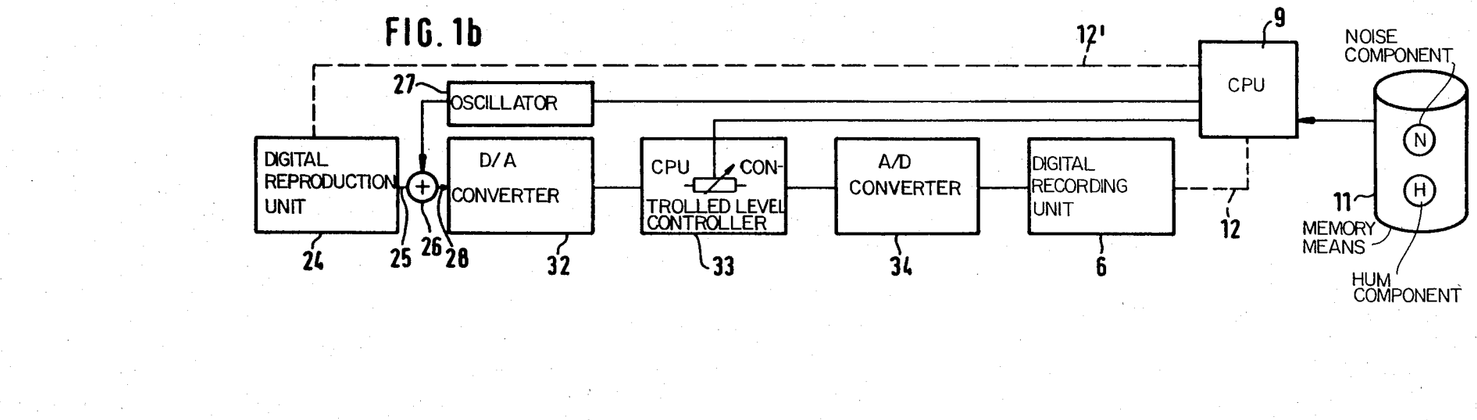
FIGS. 1b to 1e show block circuit diagrams of the part of the apparatus of FIG. 1a serving to compensate the interference signal component.

The digitized signal 23 recorded on the digital recording unit 6 and represented in FIG. 3 is compensated in a first step with regard to the hum component contained in its interference signal component. For this purpose the recorded digitized signal 23 according to FIG. 1b is reproduced with a predetermined processing speed by a digital reproduction unit 24 which is synchronized via a synchronization connection 12' with the processor 9. There is then superimposed on the reproduced signal appearing at the output 25 of the digital reproduction unit 24 in an adder stage 26 a signal with inverted phase which corresponds to the hum component and which is generated in a quartz-stable oscillator 27 which is controlled by the processor 9 in accordance with the reference interference signal which is present in the memory means 11 and which contains information on the phase and amplitude of the hum component. Thus, at the output 28 of the adder stage 26 the digitized signal freed from its hum component is available.

Figure 5A:
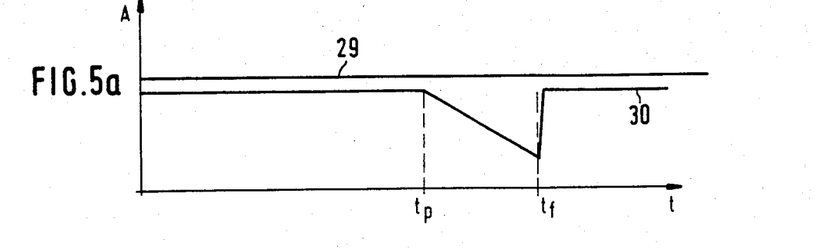
FIGS. 5a to d show signal forms in the compensation of a dynamic compression and FIG. 6 is an embodiment of the apparatus.
Figure 5B:
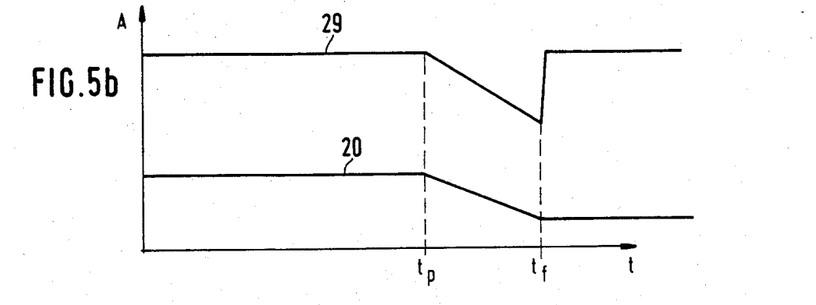
Figure 5C:
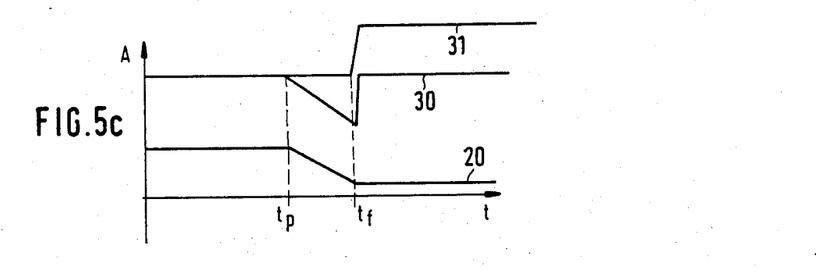
Figure 5D:
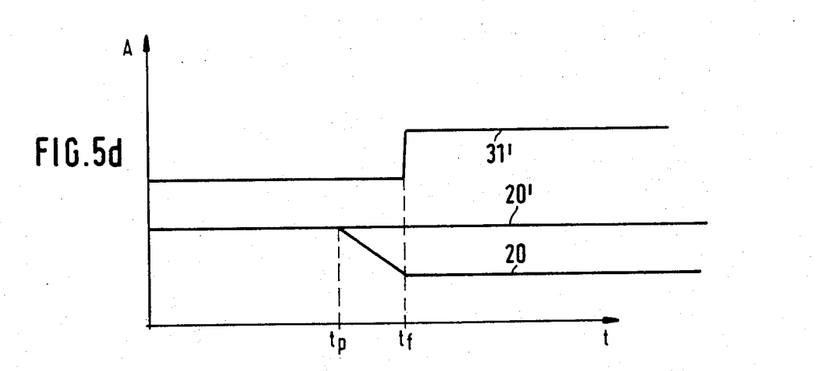

However, as apparent from the level diagrams illustrated in FIGS. 5a to d, the signal freed from its hum component may comprise a level variation changed with respect to the original dynamic and due to a dynamic compression. In FIG. 5a the level of the full modulation of the analog master tape 3 is represented by the straight line 29 parallel to the time axis whilst the curve 30 represents the actual level variation of the original signal freed from its hum component. A signal section illustrated for the time $t<t_p$ corresponds to a piano section of the original presentation on which the original audio signal was based, said piano section having been recorded however with an increased level with respect to the original presentation. Before the start of a forte section represented for the time $t>t_f$, the level variation 30 in the time interval $t_p<t<t_f$ is therefore reduced by a sound engineer monitoring the recording so that at the dynamic jump starting at the time $t_f$ no overmodulation of the master tape 3 can occur. As a result, even the forte section present at the time $t>t_f$ remains below the level of full modulation 29. This reducing of the modulation results as illustrated in FIG. 5b to an enlarged amplitude scale in a corresponding lowering of the level 20 of the noise component. In particular, during the piano section at the time $t<t_p$ the noise component thus has a relatively high level whilst due to the lower modulation at the time $t>t_f$ of the forte portion the level 20 of the noise component is relatively low. These conditions obtaining in the dynamic compression are illustrated jointly in FIG. 5c in which apart from the level variation 30 of the original signal freed from hum and recorded on the master tape 3 and the level variation 20 of the noise component the actual level variation 31 of the original underlying presentation is shown.

This property by which the level 20 of the noise component represents a measure of the dynamic compression is used according to FIG. 1b to correct this dynamic compression by remodulation. For this purpose, according to FIG. 1b the digitized signal freed from hum is converted back in a digital/analog converter 32 to an analog signal and in a following level controller 33, which is controlled by the processor 9, in dependence upon the interference signal stored in the memory means 11 for the noise component and representing the level 20 of the noise component is remodulated in such a manner that the noise level 20 of the dynamic-compressed signal is raised at the point of the dynamic jump at $t=t_f$ to its value obtaining prior to the dynamic jump. This means a remodulation of the level variation 30 to a level variation corresponding to the original presentation and indicated in FIG. 5d by 31'.

The signal dynamic-corrected in this manner is redigitized in an analog/digital converter 34 following the level controller 33 and recorded on the digital recording unit 6.

Figure 1C:
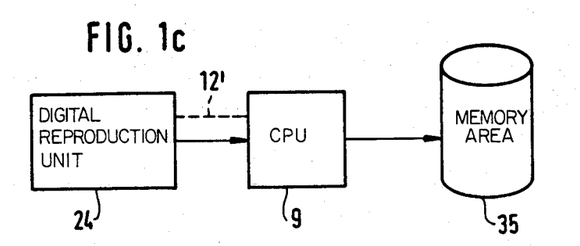

The digitized signal freed from hum and dynamic-corrected according to FIG. 1b is transmitted in FIG. 1c by means of the digital reproduction unit 24 under the control of the processor 9 to the memory means 11 in which for this purpose a memory area 35 is provided in which the digitized signal 23 is entered as illustrated in FIG. 3c.

Figure 3D:
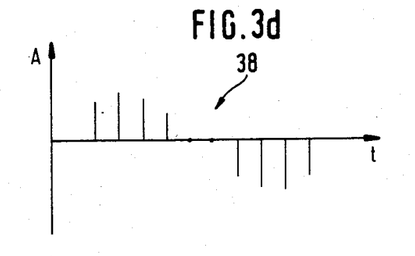

Thus, the compensation of the noise component is under the control of the processor 9. Under the control of a control program stored in the program memory 36, the processor 9 compares each of the digitized sample values of the digitized signal represented in FIG. 3c with the reference interference signal for the noise component stored in the memory means 11. Whereas the values exceeding the level 20 of the noise component illustrated in FIG. 3b are taken over as useful signal component the digitized signal is set to zero as illustrated in FIG. 3d at all points at which its value lies beneath the level 20 of the noise component. With the aid of the control program in the program memory 36 this remaining digitized signal 38 is then supplemented in accordance with the illustration of FIG. 3e in the regions set to zero by suitable interpolation values. These interpolation values are chosen in such a manner that the analog curve corresponding to the interpolated digitized signal of FIG. 3e and illustrated in FIG. 3f has a smooth transition path also in the region of the signal set to zero. This avoids the noise suppression resulting in disturbing transitions at the start and end of the regions set to zero.

Figure 1D:
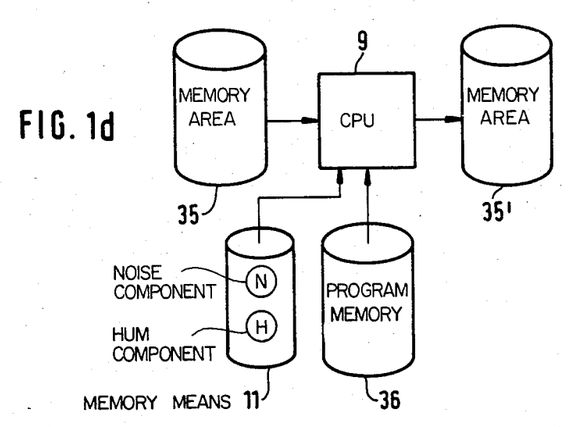
Figure 3E:
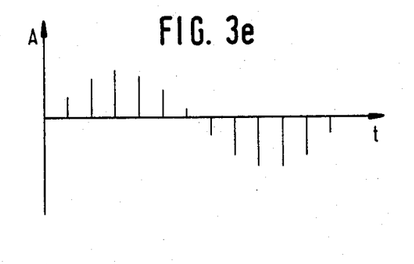
Figure 3F:
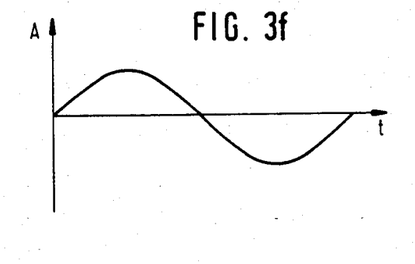
Figure 4A:
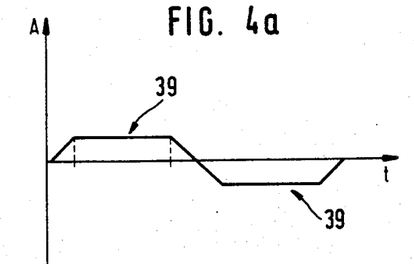
Figure 4B:
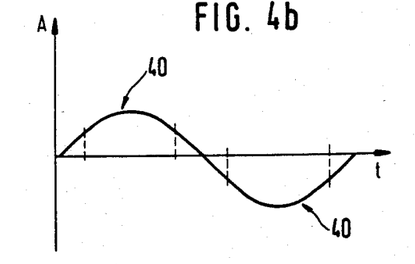

Along with the compensation of the noise component explained with reference to FIGS. 3d to f, in accordance with the illustration of FIGS. 4a and 4b any limiter influences may be eliminated. These manifest themselves according to FIG. 4a in that the signal amplitude is clipped, i.e. constant with time, in the peak regions 39 of the wave. The control program can be designed so that on detection of equality of three or more successive digitized sample values only the first and last value of this sequence of identical sample values are accepted in each case and the intermediate region bridged by an interpolation curve 40 represented in FIG. 4b. As a result of this compensation in accordance with FIG. 1d a compensated digitized signal is stored in a memory area 35'.

Figure 1E:
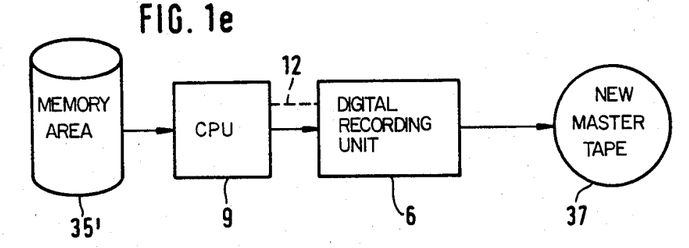

In accordance with FIG. 1e this compensated digitized signal is transmitted under the control of the processor 9 from the memory area 35' to the digital recording unit 6. In this manner a new master tape 37 is obtained which is freed from all interference signal components.

Figure 6:
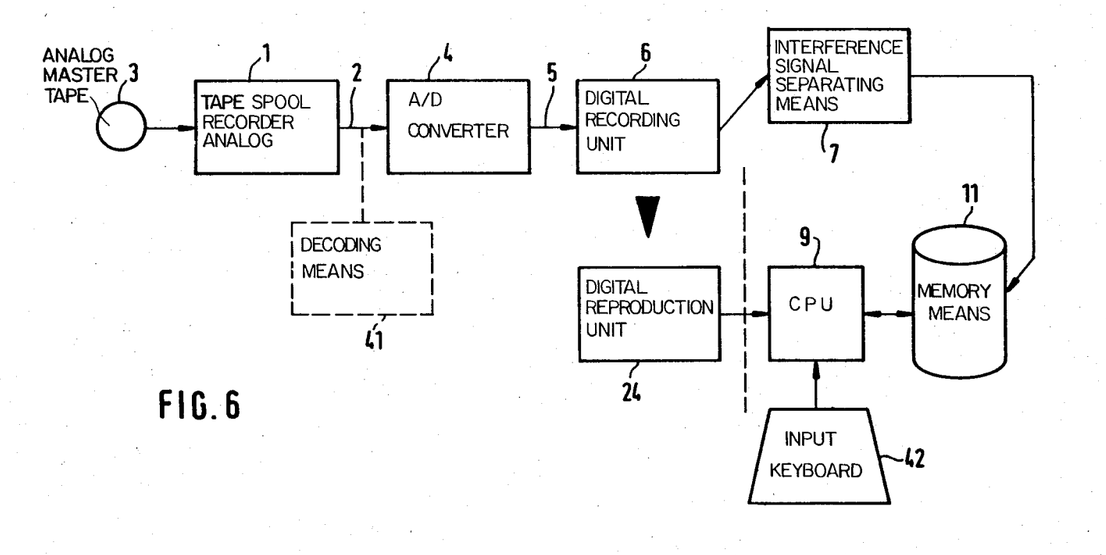

Whereas in the embodiment described above the compensation of the hum component and remodulation of the dynamics according to FIG. 1b is carried out in analog form of the signal, in an embodiment illustrated in FIG. 6 this compensation step proceeds from the digitized signal reproduced by the digital recording unit 6. Otherwise, the procedure cycles correspond to the operations explained with reference to FIGS. 1a to e and identical reference numerals are also used for identical logic blocks. Going beyond the embodiment described with reference to FIG. 1 the analog reproducing unit 1 may be followed by a decoding means 41 which is indicated as alternative in dashed line in FIG. 6. This decoding means 41 serves when required to provide a decoding in the case where the recording is made by the systems Dolby A, DBX I, Telcom and the like. Furthermore, the processor 9 is provided with an input keyboard 42 on which the user can input additional corrections for the signal to be compensated.

Figure 7:
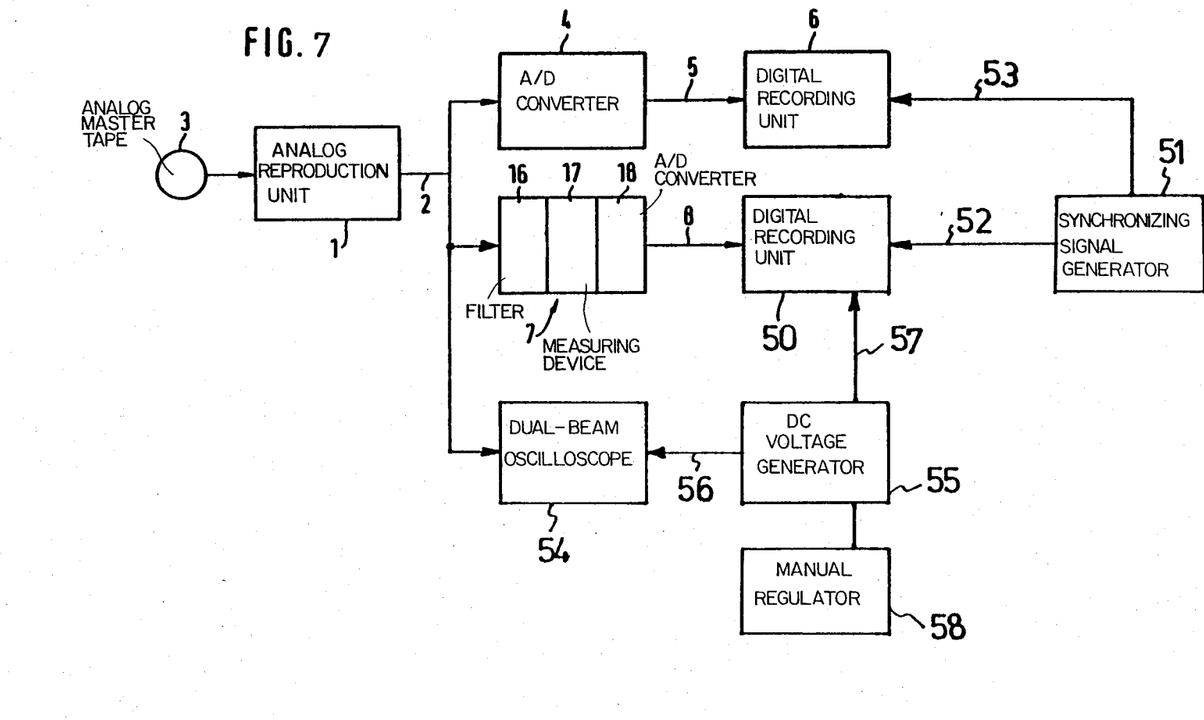
FIG. 7 is a modified embodiment of the block diagram of FIG. 1a and FIG. 8 is an oscilloscope picture for representing the noise component contained in the interference signal component.

An embodiment illustrated in FIG. 7 of the apparatus for suppressing interference in an original signal comprising a useful signal component and an interference signal component differs from the embodiment illustrated in FIG. 1a firstly in that the processor 9 and the memory means 11 connected thereto via the signal path 10 are replaced by a further digital recording unit 50, a synchronizing signal generator being connected via a synchronization connection 52 to said further digital recording unit 50 and via a synchronization connection 53 to the digital recording unit 6 also illustrated in FIG. 1a. Furthermore, the reference numerals 1 to 8 and 16 to 18 designate the same blocks as in the embodiment illustrated in FIG. 1a. Secondly, in addition to the embodiment described in FIG. 1a in the embodiment of FIG. 7 a dual-beam oscilloscope 54 is connected with its one input to the analog reproducing unit 1. A dc voltage generator 54 having both an analog output 56 and a digital output 57 is connected with its analog output 56 to the other input of the dual-beam oscilloscope 54. The digital output 57 carrying a digitized dc voltage corresponding to the dc voltage appearing at the analog output 56 is coupled to the further digital recording unit 50. The dc voltage level furnished by the dc voltage generator 54 is adjustable in its magnitude by means of a manual regulator 58 connected to the dc voltage generator 55.

Figure 8:
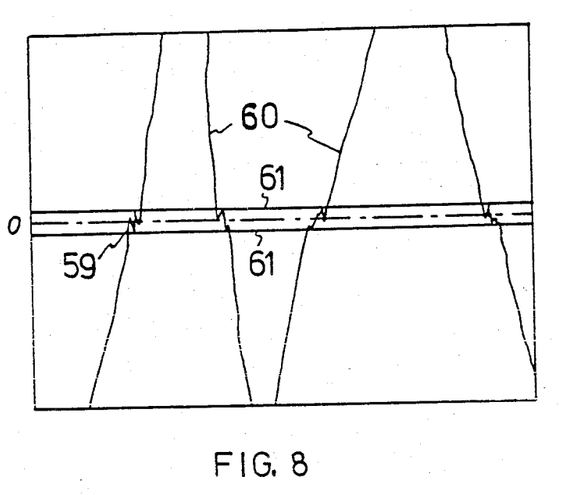

Whereas in the embodiment illustrated in FIG. 1a the interference signal component is acquired by means of the CPU 9 and the memory 11, in the embodiment illustrated in FIG. 7 the digital recording unit 50 serves to acquire the interference signal component. In particular, for this purpose the noise component 59 contained in the interference signal component is made visible by a suitable adjustment of the screen image resolution of the dual-beam oscilloscope 54 at the zero passages of the original signal 60, which is illustrated with the aid of FIG. 8. The dc voltage applied to the other input of the dual-beam oscilloscope 54 from the dc voltage generator 55 generates on both sides of the zero line of the screen image dc voltage lines 61 whose spacing is set in each case by means of the manual regulator 58 so that the two dc voltage lines 61 exactly border the noise component. At the same time the noise level determined in this manner is recorded on the further digital recording unit 50 in that the digitized dc voltage appearing at the digital output 57 and corresponding to the spacing of the dc voltage lines 61 is recorded under the control of the synchronizing signal generator 51.

At the same time the original signal also passes through the interference signal separating means 7 whose filter means 16 comprises a switchable narrowband filter which allows to pass frequencies of either 47 to 54 Hz or 57 to 64 Hz. The hum component is thereby filtered out and also recorded synchronously with the noise component on the further digital recording unit 50. As already explained in conjunction with FIG. 1a, furthermore in synchronism therewith the original signal is recorded together with the synchronizing signal on the digital recording unit 6. Thus, on the further digital recording unit 50 altogether the hum component, the digital dc voltage signal corresponding to the noise component and the synchronizing signal are recorded whereas simultaneously on the digital recording unit 6 the original signal is recorded together with the synchronizing signal.

The original signal from the digital recording unit 6 digitized in this manner and provided with the synchronizing signal and the interference signal component consisting of the hum component and noise component together with the synchronizing signal from the further digital recording unit 50 are now transferred simultaneously or in succession to a data processing system in which the interference signal compensation described with reference to FIGS. 3a to 5d is carried out by suitable programs. Preferably, the sampling frequency and the digital quantization of the two digital recording units 6, 50 are identical. In particular, all digital values of the original signal lying beneath the noise level are erased and replaced by the interpolation curves described with the aid of FIGS. 3a to 3f. To eliminate the hum component the recorded hum component is negated and added to the recording of the original signal. Furthermore, the original dynamics as described in conjunction with FIGS. 5a to 5d are reconstructed and any limiter influences eliminated as described in conjunction with FIGS. 4a and 4b.

The method described above is also suitable for suppressing noise in video signals and processing the latter. During the transmission of the numerical values of the digitized original signal on the data processing system any vertical blanking intervals can be removed from the numerical value and stored as required together with the typical record structure. If the numerical values are coded in matrix form the latter is decoded and the type of coding stored as required. In the processing of colour video signals subsequent colour corrections may be made.

I claim:

1. Method for suppressing interference in an original signal, in particular an audio signal, comprising a useful signal component and an interference signal component, characterized in that the original signal is digitally recorded with a sampling frequency corresponding at least to the essential information content of its useful signal component, that the interference signal component is detected and its level stored as reference interference signal with a sampling frequency corresponding at least to a level change rate of the interference signal component under the control of a computer in phase synchronism with the recorded digitized signal, and that the recorded digitized signal is processed with a speed independent of its recording speed and its interference signal component compensated under computer control in dependence upon the stored reference interference signal.

2. Method according to claim 1, characterized in that the interference signal component is split into a hum component and a noise component and the corresponding reference interference signals are separately stored.

3. Method according to claim 2, characterized in that as reference interference signal for the hum component the amplitude thereof and the phase thereof with respect to the original signal is stored.

4. Method according to claim 2, characterized in that the hum component is determined as the frequency component of the original signal lying in a predetermined hum frequency interval.

5. Method according to claim 2, characterized in that the noise component is detected as the component of the original signal lying below a predetermined amplitude limit small with respect to the mean level of the original signal.

6. Method according to claim 5, characterized in that the noise component is detected as the component of the original signal lying above a predetermined frequency limit disposed beyond the essential frequency components of the useful signal component.

7. Method according to claim 2, characterized in that the noise component is detected in the pauses of the useful signal.

8. Method according to claim 2, characterized in that the noise component is detected as the signal component remaining in the region of the zero passages of the original signal.

9. Method according to claims 2, characterized in that in the compensation firstly a compensation signal corresponding to the stored hum interference signal in amplitude and frequency is superimposed phase-inverted on the recorded digitized signal, and that the signal from which the hum component has been removed in this manner is recorded as new digitized signal and thereafter the noise component is compensated.

10. Method according to claim 1, characterized in that for the compensation of the noise component the amplitude of the digitized signal is compared in phase synchronism with the reference interference signal corresponding to the noise component, that the digitized signal is put equal to zero at the points at which its amplitude is smaller or equal to the reference interference signal, and that the remaining digitized signal in the regions set to zero is supplemented under computer control by interpolation.

11. Method according to claim 9, characterized in that the level of the signal from which the hum has been removed is modulated again in proportion to a change of the level of the noise component.

12. Method according to claim 1, characterized in that the compensated digitized signal is replaced in the regions which have amplitude limitation under the control of a computer by an interpolation curve.

13. Method according to claim 1, characterized in that the phase synchronization is carried out by continuous consecutive counting of the bits of the digitized signal.

14. Apparatus for carrying out the method according to claim 1, characterized by an analog reproduction unit (1) by which the original signal recorded analog on a recording medium can be reproduced, and an analog/digital converter (4) by which the reproduced original signal can be converted with the sampling frequency associated with the useful signal component to the digitized signal (23), a digital recording unit (6) for recording the digitized signal (23), an interference signal separating means (7) by which the interference signal component contained in the original signal can be detected and can be digitized with the sampling frequency associated with the interference signal component, a memory means (11) which is controlled by a processor (9) and into which the reference interference signal formed by the sampling of the interference signal component can be entered according to amplitude and phase position related to the digitized signal (23), a digital reproduction unit (24) by which the recorded digitized signal (23) can be reproduced with the predetermined processing speed and a compensation means which is controlled by the processor (9) and in which the interference signal component in the reproduced digitized signal (23) can be compensated in dependence upon the reference interference signal present in the memory means (11).

15. Apparatus according to claim 14, characterized in that the interference signal separating means comprises a band filter means (16) which is tunable to the hum frequency and has adjustable band width, by which the hum component of the interference signal component can be detected and a correspondingly separately storable reference interference signal can be produced.

16. Apparatus according to claim 14, characterized in that the interference signal separating means comprises a combined amplitude filter and high-pass means by which the noise component of the interference signal component is detected and a corresponding separately storable reference interference signal can be generated.

17. Apparatus according to claim 14, characterized in that the compensation means comprises a level controller (33) controlled by the processor (9) by which the reproduced signal can be remodulated in dependence upon the level of the noise component.

18. Apparatus according to claim 14, characterized in that the memory means comprises a memory area (35, 35') into which the digitized signal (23) may be entered.

19. Apparatus according to claim 14, characterized in that the interference signal separating means (7) comprises a measuring device (17) by which the level variation of the noise component detected may be indicated.

20. Apparatus for carrying out the method according to claim 1, characterized by a digital recording unit (6) for digital recording of the original signal together with a synchronizing signal generated by a synchronizing signal generator (51), a measuring device for generating a digitized dc voltage signal corresponding to the level of the noise component contained in the original signal, and a further digital recording unit (50) for the digital recording of the dc voltage signal together with the synchronizing signal furnished by the synchronizing signal generator (51).

21. Apparatus according to claim 20, characterized in that the measuring device comprises a dual-beam oscilloscope (54) and a dc voltage generator (55) provided with an analog output (56) and a digital output (57) for generating a dc voltage with adjustable level, that the one input of the dual-beam oscilloscope (54) is subjected to the original signal and the other input to the analog dc voltage signal of the dc voltage generator (55), that the input of the further digital recording unit is subjected to the digital dc voltage signal of the dc voltage generator (55), and that the spacing of the time-axis-parallel lines (61) caused by the analog dc voltage signal on the screen of the dual-beam oscilloscope is set corresponding to the level of the noise component lying between said lines.

22. Apparatus according to claim 21, characterized in that a filter means (16) is provided which is subjected to the original signal and has a pass range in the frequency range of the hum component contained in the original signal, and the output signal thereof is recorded on the further digital recording unit (50) together with the synchronizing signal generated by the synchronizing signal generator (51).

* * * * *